United States Patent
Shivalinga

(10) Patent No.: US 12,116,211 B2
(45) Date of Patent: Oct. 15, 2024

(54) ECCENTRIC SHAFT BLIND SPACER ASSEMBLY

(71) Applicant: Goodrich Corporation, Charlotte, NC (US)

(72) Inventor: Vinod Kumar Shivalinga, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 179 days.

(21) Appl. No.: 17/893,024

(22) Filed: Aug. 22, 2022

(65) Prior Publication Data

US 2023/0339692 A1    Oct. 26, 2023

(30) Foreign Application Priority Data

Apr. 20, 2022    (IN) .............................. 202241023258

(51) Int. Cl.
  *B65G 39/12* (2006.01)
  *B64D 9/00* (2006.01)

(52) U.S. Cl.
  CPC ............... *B65G 39/12* (2013.01); *B64D 9/00* (2013.01); *B64D 2009/006* (2013.01)

(58) Field of Classification Search
  CPC ..... B64D 9/00; B64D 2009/006; B65G 39/12

USPC ........................................... 244/118.1, 118.2
  See application file for complete search history.

(56) References Cited

U.S. PATENT DOCUMENTS

| | | | | |
|---|---|---|---|---|
| 4,802,572 A | * | 2/1989 | Shorey ................. | B65G 13/073 74/567 |
| 5,042,645 A | * | 8/1991 | Pritchard ................. | B64D 9/00 198/782 |
| 10,507,977 B2 | * | 12/2019 | Baer ...................... | B65G 39/02 |
| 10,759,605 B1 | | 9/2020 | Shivalinga et al. | |
| 2021/0111645 A1 | | 4/2021 | Saritha et al. | |

FOREIGN PATENT DOCUMENTS

KR    20160001791 A  *  1/2016  ............. B65G 39/12

* cited by examiner

*Primary Examiner* — James R Bidwell
(74) *Attorney, Agent, or Firm* — SNELL & WILMER L.L.P.

(57) ABSTRACT

A spacer assembly includes a shaft, a spacer having a first end and a second end, the spacer configured to receive the shaft; a collar configured to couple with the shaft at the first end to secure the shaft in the spacer when the shaft is received by the spacer, a lever configured to couple with the shaft at the first end, the lever configured to rotate the shaft, and a screw configured to fasten the lever to the spacer.

17 Claims, 12 Drawing Sheets

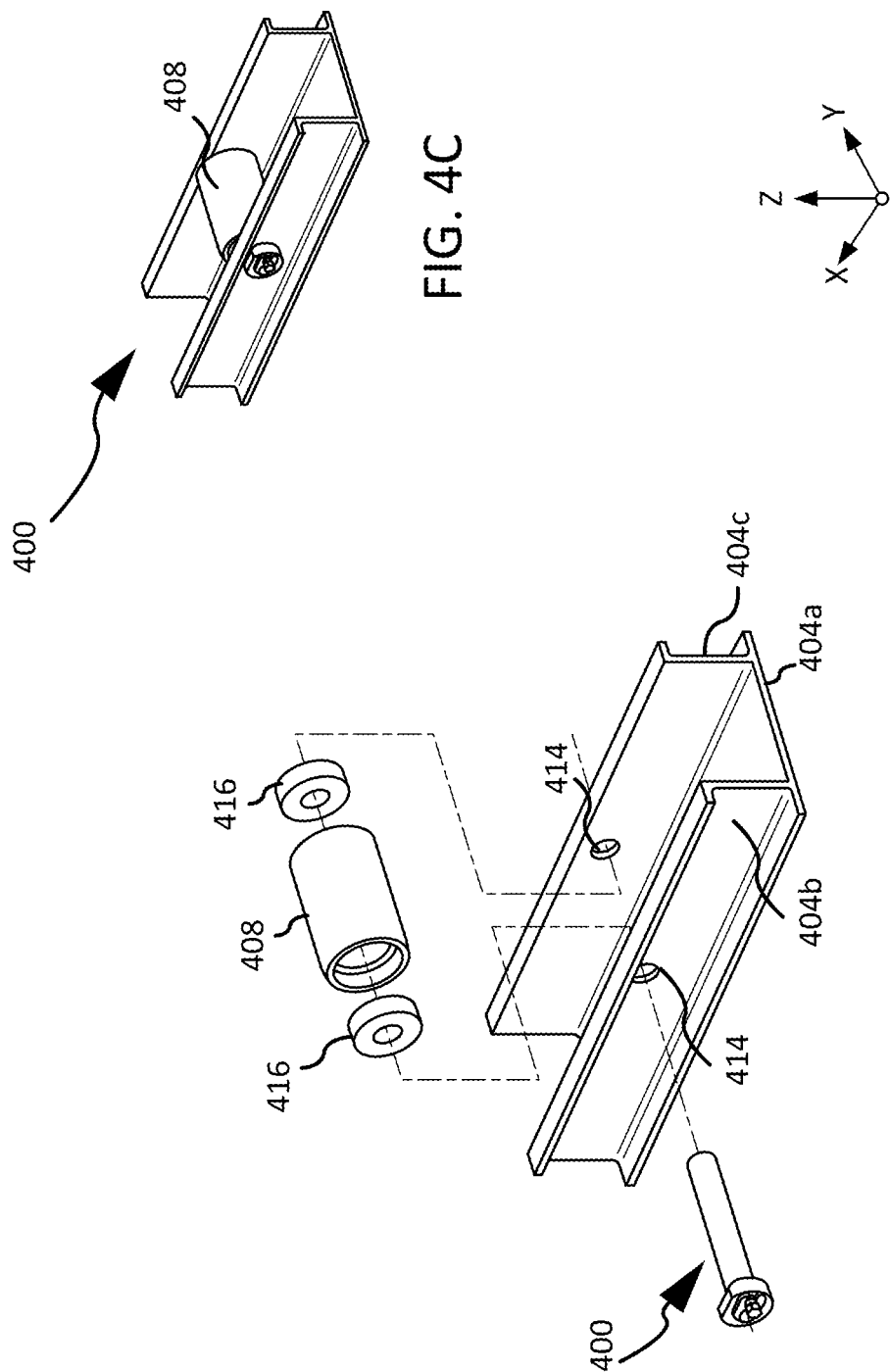

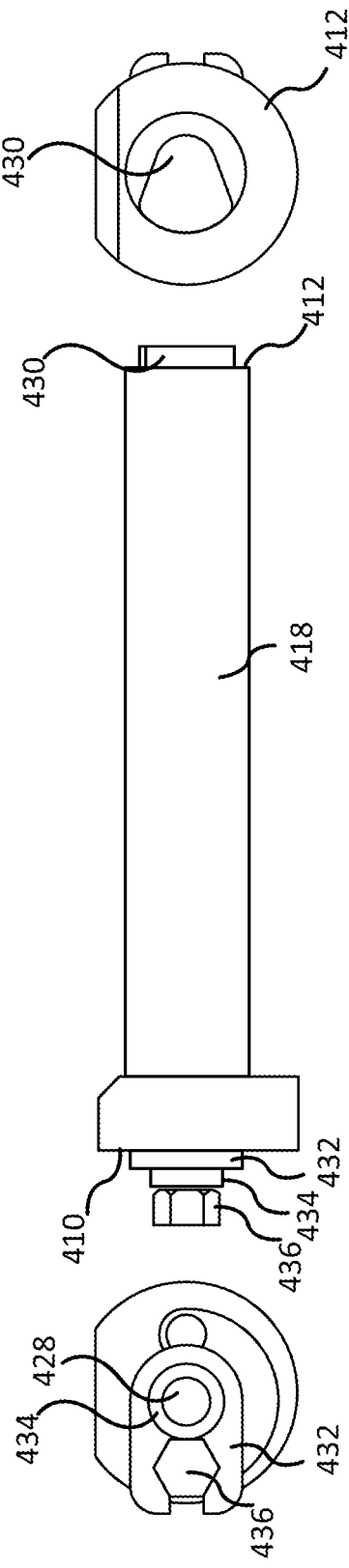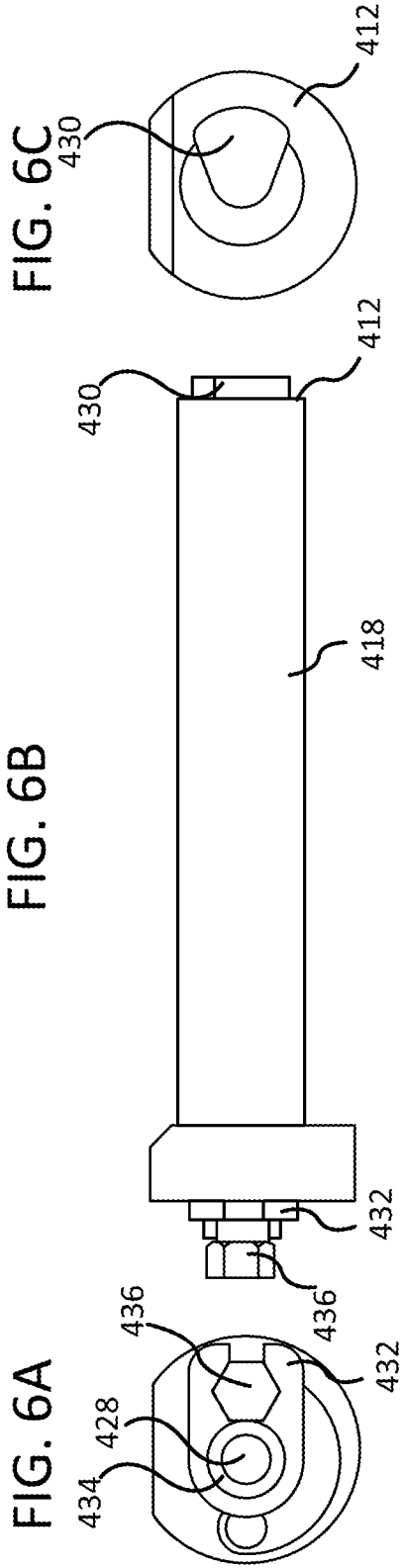

ECCENTRIC SHAFT BLIND SPACER ASSEMBLY

CROSS-REFERENCE TO RELATED APPLICATIONS

This application claims priority to, and the benefit of, India Patent Application No. 202241023258, filed Apr. 20, 2022 (DAS Code CD15) and titled "ECCENTRIC SHAFT BLIND SPACER ASSEMBLY," which is incorporated by reference herein in its entirety for all purposes.

FIELD

The present disclosure generally relates to the field of securing cargo and, more particularly, an aircraft cargo handling system architecture.

BACKGROUND

Cargo handling systems, such as those used by aircraft for transport of containerized cargo or pallets, also referred to as unit load devices (ULDs), typically include longitudinal trays containing transport rollers positioned along a cargo deck floor to facilitate movement of the ULDs relative to the deck floor. Rollers are installed in the trays (e.g., long extruded channels) using spacers. These trays are attached to the floor beams at the bottom using fasteners. Since the rollers are located throughout the cargo compartment, sometimes the rollers are located over the tray-frame attachment fasteners. Further, other locations have limited accessibility for installations of roller, such that only one side it accessible and the entire assembly must be removed to install the roller. In such cases, the rollers and locking pins are removed and delivered as separate parts, so that they can be installed after attaching the tray to the frames. Current solutions result in time consuming installation of the roller. Additionally, the assembly includes loose parts which can be lost during installation and/or removal in the line.

SUMMARY

A spacer assembly includes a shaft having an eccentric leg, a spacer having a first end and a second end, the spacer configured to receive the shaft such that the eccentric leg is positioned adjacent to the second end of the spacer, a lever configured to couple with the shaft at the first end, the lever configured to rotate the shaft, and a screw configured to fasten the lever to the spacer.

In various embodiment, the space assembly includes a collar configured to couple with the shaft at the first end to secure the shaft in the spacer when the shaft is received by the spacer.

In various embodiments, the eccentric leg extends radially from the shaft and beyond a circumference of the spacer when the shaft is rotated by the lever in a locked position.

In various embodiments, the spacer includes an eccentric hole extending between the first end and the second end. The eccentric hole is configured to receive the shaft.

In various embodiments, the spacer assembly further includes a spacer head coupled to the spacer at the first end. The spacer head has a surface. The spacer head includes the eccentric hole and a guide groove disposed on the surface. The guide grove extends along a circumference of the spacer head. The guide groove surrounds at least a portion of the eccentric hole.

In various embodiments, the spacer head further includes at least one threaded hole disposed along the guide groove. The at least one threaded hole is configured to couple with the screw such that the screw fastens the lever in a locked or unlocked position.

A cargo handling system includes an aircraft structure frame, a tray coupled to the frame, a roller assembly configured to be disposed within the tray, and a spacer assembly comprising a shaft having an eccentric projection configured to interact with the roller assembly and the tray.

In various embodiments, the tray includes a base, a first sidewall extending from the base, and a second sidewall extending from the base. The first sidewall has a first aperture. The second sidewall has a second aperture. The second sidewall is opposite the first sidewall. The first aperture and the second aperture are configured to receive the spacer assembly.

In various embodiments, the eccentric projection extends radially from the shaft and is configured to be in confronting relation with an outside surface of the second sidewall in a locked position.

In various embodiments, the spacer assembly includes a spacer having a first end and a second end, the spacer configured to receive the shaft, a collar configured to couple with the shaft at the first end to secure the shaft in the spacer when the shaft is received by the spacer, a lever configured to couple with the shaft at the first end, the lever configured to rotate the shaft relative to the spacer, and a screw configured to fasten the lever to the spacer.

In various embodiments, the spacer includes an eccentric hole extending between the first end and the second end. The eccentric hole configured to receive the shaft.

In various embodiments, the cargo handling system of claim further includes a spacer head coupled to the spacer at the first end. The spacer head includes the eccentric hole and a guide groove disposed on a surface of the spacer head. The guide grove extends along a circumference of the spacer head. The guide groove surrounding the eccentric hole.

In various embodiments, the spacer head further comprises at least one threaded hole disposed along the guide groove. The at least one threaded hole configured to couple with the screw such that the screw fastens the lever in a locked or unlocked position.

In various embodiments, the spacer head includes a flat side configured to interface with the tray to prevent rotation of the spacer.

In various embodiments, the spacer head has a diameter greater than a diameter of the spacer such that the spacer head is configured to be in confronting relation with and outside surface of the first sidewall.

In various embodiments, the roller assembly includes a roller and at least one bearing configured to be positioned between the first and second sidewalls and aligned with the first and second apertures such that the spacer assembly is configured to be received by the first and second apertures and the roller assembly to secure the roller assembly in position within the tray.

A method of operating a cargo handling system includes positioning a roller assembly within a tray, the tray coupled to an aircraft structure frame, and inserting a spacer assembly through the tray and the roller assembly, the spacer assembly comprising a shaft having an eccentric projection configured to interact with the roller assembly and the tray.

In various embodiments, the method further includes loosening a screw of the spacer assembly, wherein the screw is coupled to a lever and the lever is coupled to the shaft, rotating the screw and the lever 180 degrees, and tightening the screw.

In various embodiments, the rotation of the lever rotates the shaft such that the eccentric projection rotates and becomes positioned in confronting relation with an outside surface of a sidewall of the tray to lock the spacer assembly in place within the tray.

In various embodiments, the spacer assembly includes at least one threaded hole configured to couple with the screw such that the screw fastens the lever in a locked or unlocked position.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

FIG. 4B is a perspective view of a tray configured to couple with a spacer assembly, in accordance with various embodiments;

FIG. 4C is a perspective view of a tray coupled with a spacer assembly, in accordance with various embodiments;

FIGS. 6A, 6B, and 6C illustrate a side view of a spacer assembly in an unlocked position, in accordance with various embodiments; and FIGS. 7A, 7B, and 7C illustrate a side view of a spacer assembly in a locked position, in accordance with various embodiments.

DETAILED DESCRIPTION

Figure 1A:
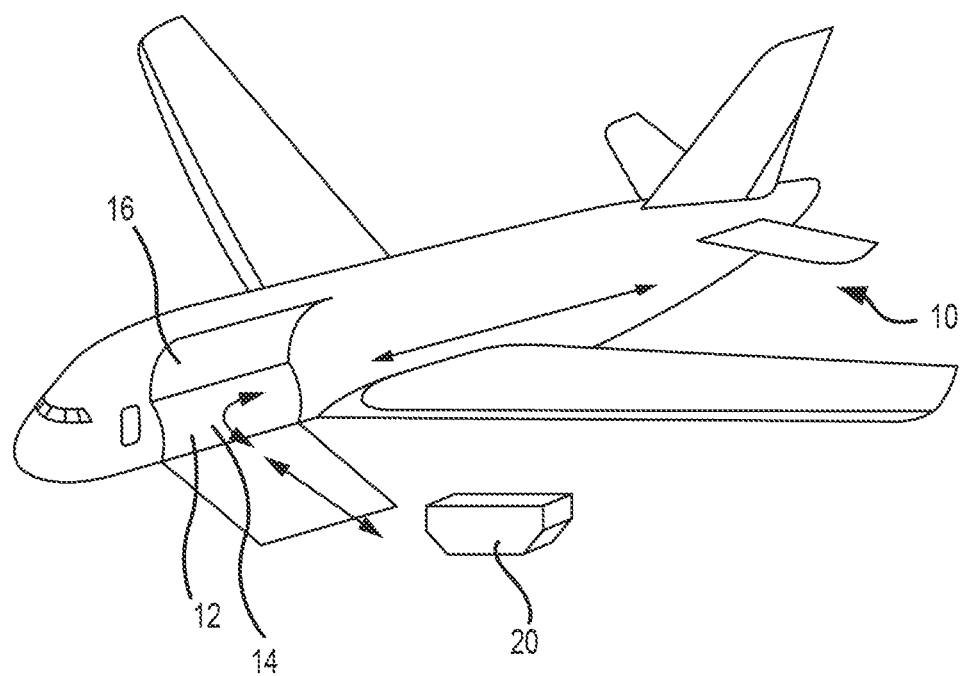
FIG. 1A illustrates a schematic of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20 may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
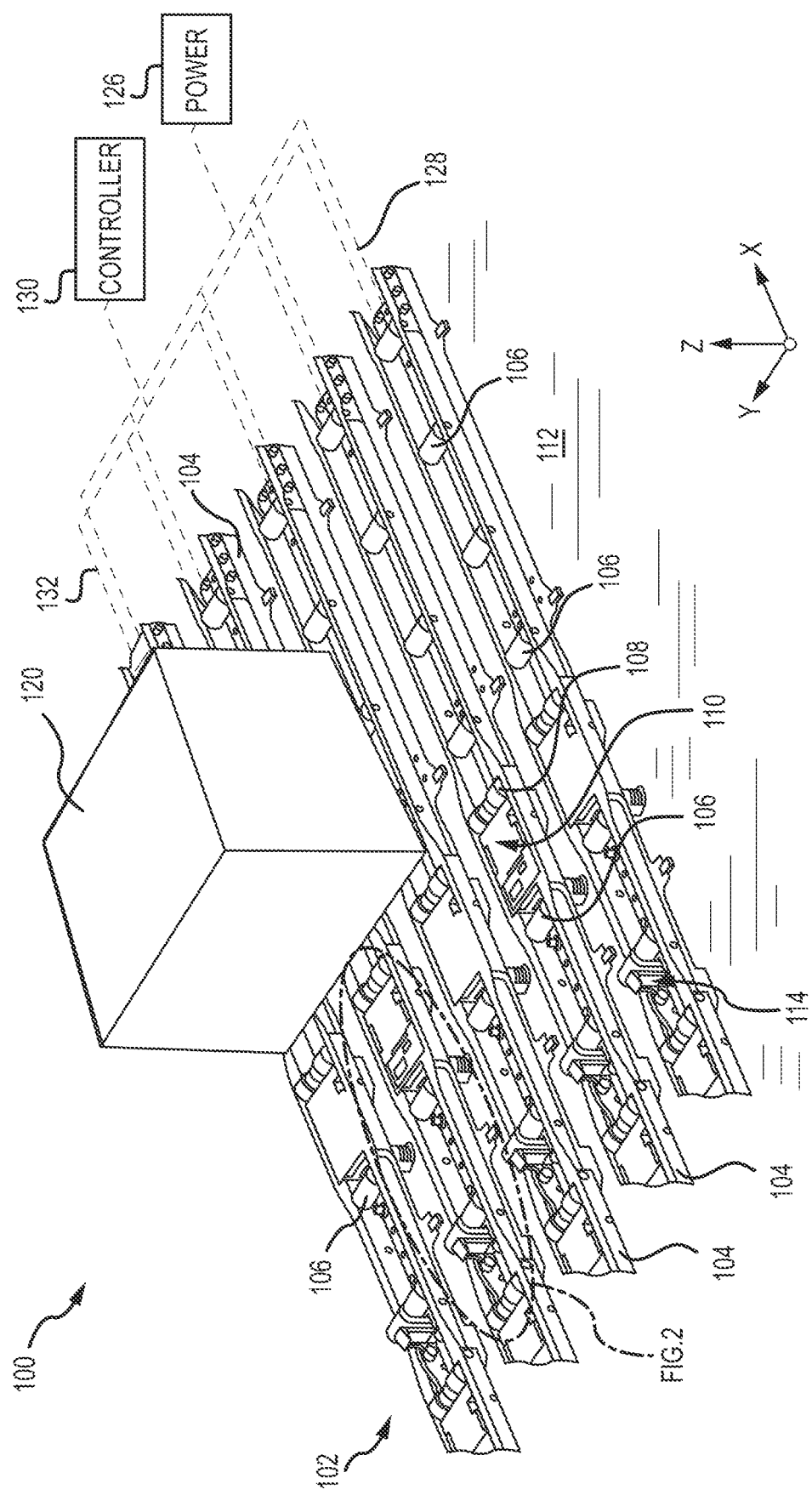
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or rollers 108 that may be actively powered by a motor. In various embodiments, one or more of the plurality of trays 104 is positioned longitudinally along the cargo deck 112—e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device 114 returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. The system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
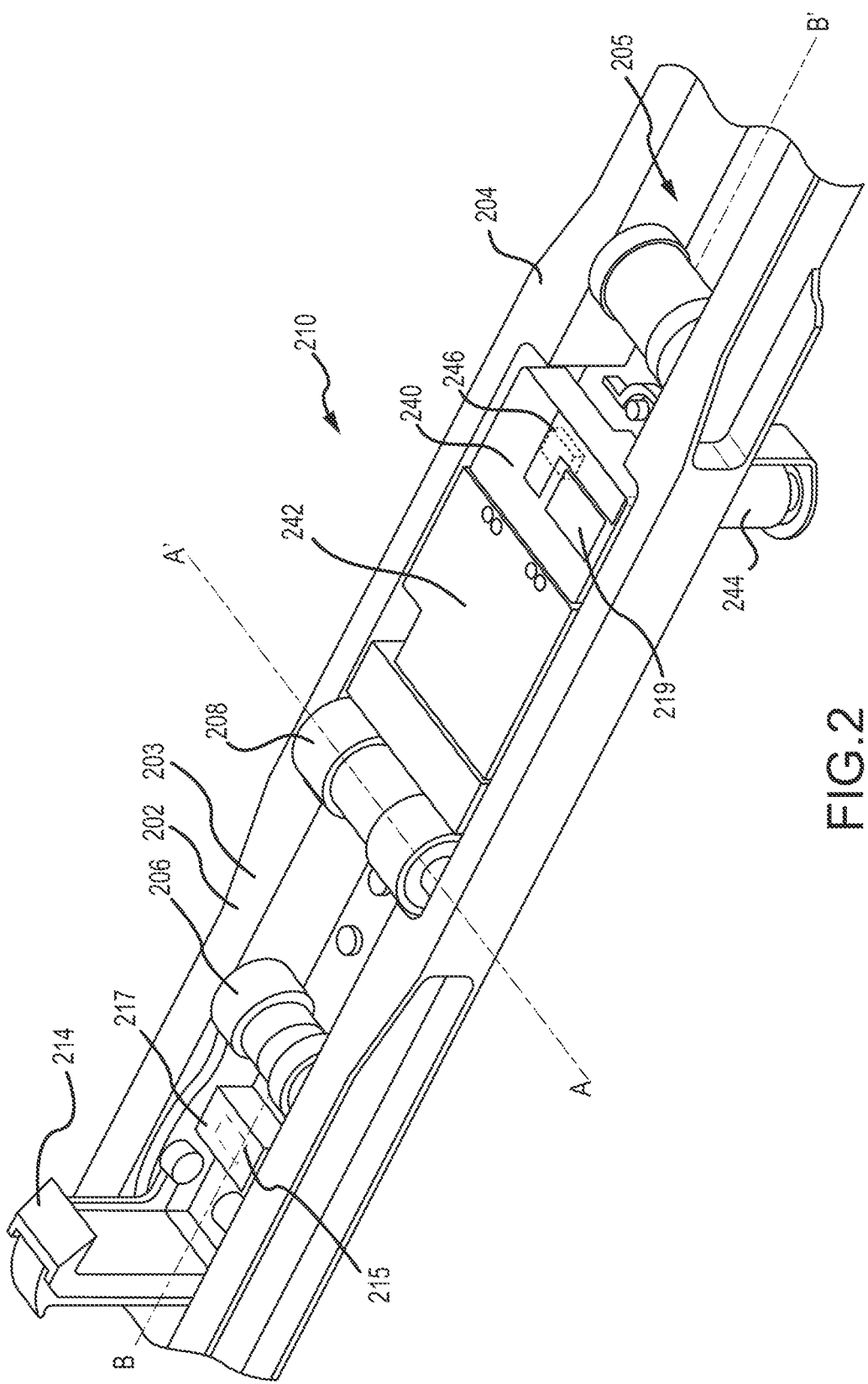
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to move the ULD in a direction parallel to the longitudinal axis B-B' of the tray 204 or in a direction that is perpendicular to the longitudinal axis B-B'. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
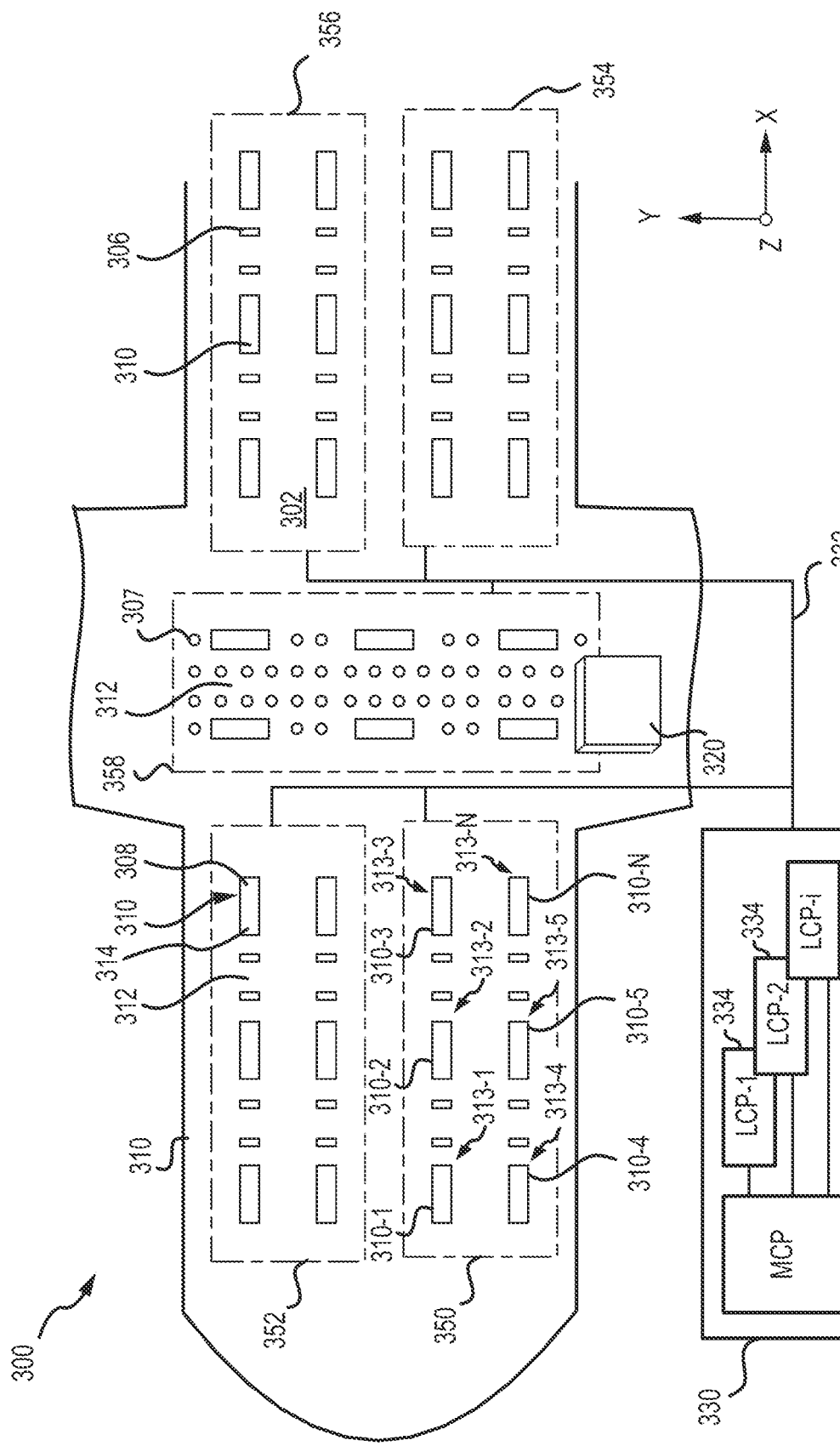
FIG. 3 illustrates a schematic view of a cargo deck having a cargo handling system with a plurality of PDUs, in accordance with various embodiments.

Referring now to FIG. 3, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 307 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track 350, 354 and a starboard-side track 352, 356 along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 313-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

Referring now to FIGS. 4A-4F, a spacer assembly 400 is illustrated, in accordance with various embodiments. The spacer assembly 400 is illustrated with an aircraft structure frame 402 and a tray 404 installed over the frame 402. The tray 404 is configured to be coupled (attached, fixed, etc.) to the frame 402. The tray 404 comprises a base 404a, a first sidewall 404b, and a second sidewall 404c. The base 404a may comprise a mating surface configured to couple to the aircraft structure frame 402. The base 404a may be coupled to a respective aircraft frame 402 by a fastener, an adhesive, or the like. For instance, the tray 404 may be coupled to the frame 402 via an attachment bolt 406. The attachment bolt 406 may comprise a plurality of bolts screwed into a through hole disposed on the base 404a of the tray 404 and received by the frame 402.

In various embodiments, the first sidewall 404b extends vertically in the Z-direction from the base 404a on a first side of the base 404a. Similarly, the second sidewall 404c extends vertically in the Z-direction from the base 404a on a second side of the base 404a, the second side being opposite the first side. Although illustrated as extending vertically, the sidewalls 404b, 404c are not limited in this regard. For example, the sidewalls 404b, 404c may extend from the base 404a at an angle, in accordance with various embodiments. The tray 404, which may be one of the trays in the plurality of trays 104 may be made of a metal, a composite, or the like. In various embodiments, the tray 404 may be a carbon fiber composite, or the like.

Figure 4A:
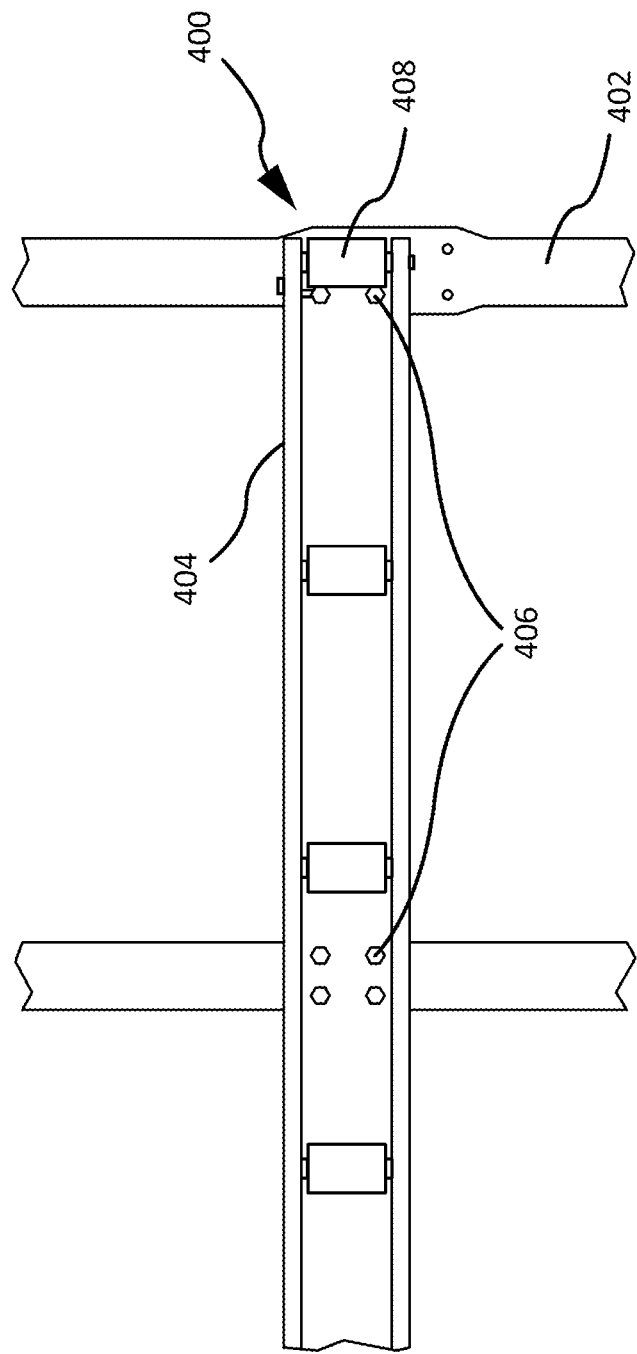
FIG. 4A is a top view of a tray, in accordance with various embodiments.

A roller 408 may be configured to be positioned between the sidewalls 404b, 404c and above the attachment bolt 406 once installed, as seen in FIG. 4A. Due to this configuration, the rollers 408 are removed and/or delivered as a separate part so that they can be installed after attaching the tray 404 to frames 402. Accordingly, the spacer assembly described herein facilitates quick installation/removal of these rollers, as well as prevent unauthorized removal from the aircraft.

The spacer assembly 400 may be characterized as having a first end 410 and a second end 412 that are spaced from one another along a longitudinal dimension. Each sidewall 404b, 404c includes an aperture 414 that extends into/through the corresponding sidewall 404b, 404c for receiving the spacer assembly 400. Bearings 416 may be positioned on either end of the roller 408 when the roller 408 is installed along the tray 404, the roller 408 and the bearings 416 each having hollow centers configured to receive the spacer assembly 400. During installation, the roller 408 and the bearings 416 are aligned with the apertures 414 such that the spacer assembly 400 is received by the roller 408, the bearings 416, and the apertures 414, and is installed within each component (e.g., see FIG. 4C).

Figure 4D:
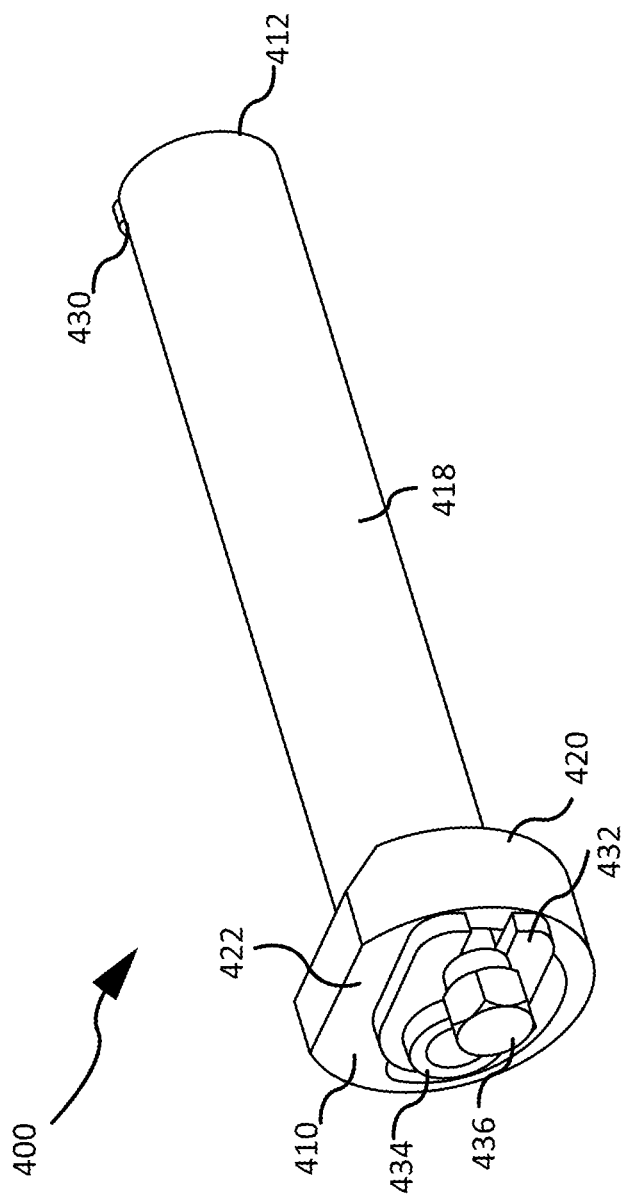
FIG. 4D illustrates a schematic view of a spacer assembly, in accordance with various embodiments.
Figure 4E:
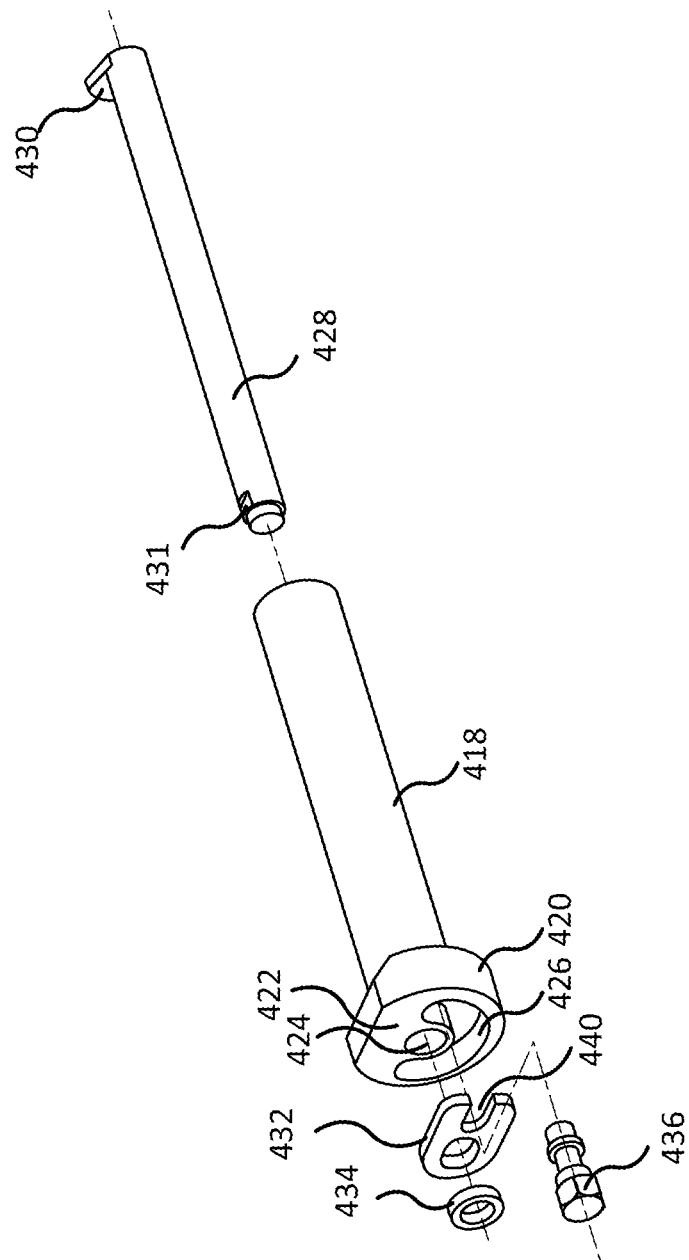
FIG. 4E illustrates an exploded, perspective view of a spacer assembly, in accordance with various embodiments.
Figure 4F:
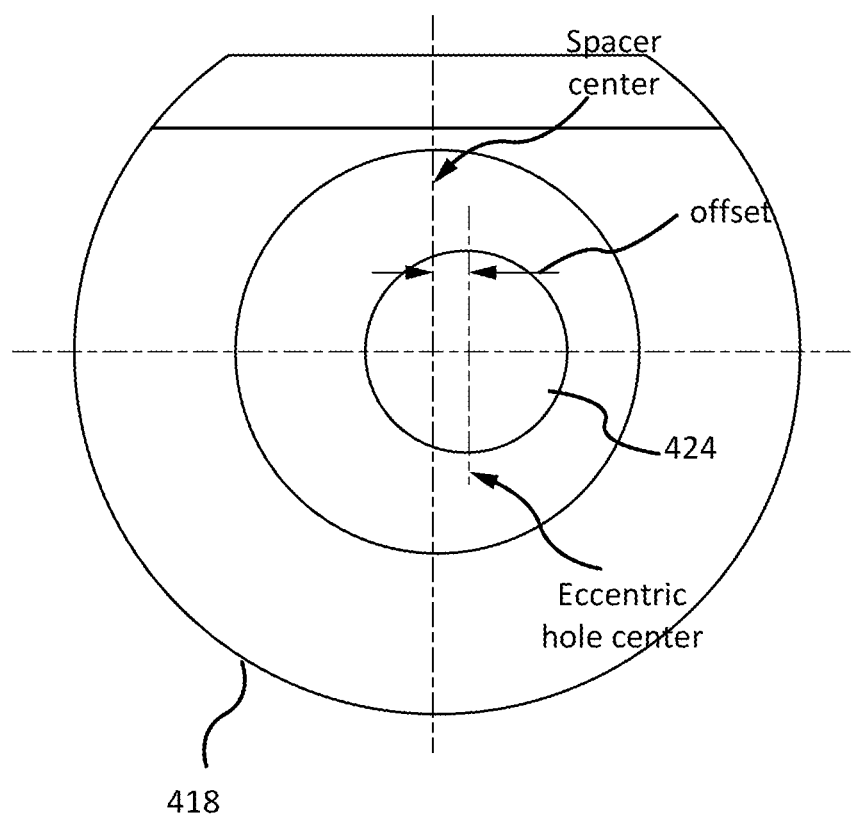
FIG. 4F illustrates a front view of a spacer of a spacer assembly, in accordance with various embodiments.

With reference to FIGS. 4D and 4E, the spacer assembly 400 includes a spacer 418. The spacer 418 is coupled to a spacer head 420 at the first end 410 having a surface 422. The spacer head 420 has a diameter greater than a diameter of the spacer 418. The spacer head 420 is configured to remain on an outer surface of the first sidewall 404b when the spacer assembly 400 is installed in the tray 404. The spacer head 420 may be D-shaped (e.g., the spacer head 420 is substantially circular with a flat top) to prevent rotation of the spacer 418 when installed. For instance, the flat top may interfere with a flange of the tray 404. The surface 422 includes an eccentric hole 424 and a guide groove 426. As shown in FIG. 4F, the eccentric hole 424 is positioned offset from the center of the spacer 418. The eccentric hole 424 extends across the spacer 418 such that the spacer 418 is a hollow cylinder extending from the first end 410 to the second end 412.

The spacer assembly 400 includes a shaft 428. The shaft 428 is configured to be substantially received by the spacer 418 such that the shaft 428 similarly extends from the first end 410 to the second end 412 when positioned in the spacer 418. The shaft 428 includes an eccentric leg 430. The eccentric leg 430 is disposed at the second end 412 of the space assembly 400. The eccentric leg 430 is an eccentric projection (e.g., flange, overhang, etc.) extending radially from the shaft. The eccentric leg 430 is configured to extend beyond the perimeter of the spacer 418. Further, the eccentric leg 430 is configured to remain on an outer surface of the second sidewall 404c when the spacer assembly 400 is installed in the tray 404.

The spacer assembly 400 further includes a lever 432, a collar 434, and a screw 436. The lever 432, the collar 434, and the screw 436 are configured to operate together to secure the spacer 418 and the shaft 428 in position when installed within the tray 404. For instance, the lever 432 and the collar 434 may each have an aperture configured to receive the shaft 428 at the first end 410 when the spacer 418, positioned through the apertures 414 of the tray 404, receives the shaft 428. The collar 434 may be press fit or swaged on the shaft 428 to secure the shaft 428 inside the spacer 418, for instance. The shaft 428 may have a cut-out 431 that engages a corresponding feature of lever 432 to prevent undesired rotation of the shaft 428 within the spacer 418. The lever 432 is further configured to mate with the screw 436 such that the screw 436 may be positioned through a slot 440 of the lever 432 and into the guide groove 426 of the spacer head 420.

Figure 5B:
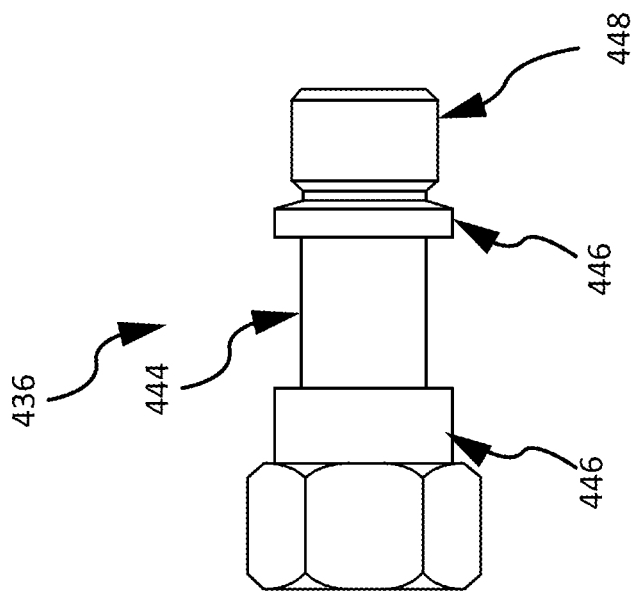
FIG. 5B illustrates a detailed perspective view of a screw of a spacer assembly, in accordance with various embodiments.
Figure 5A:
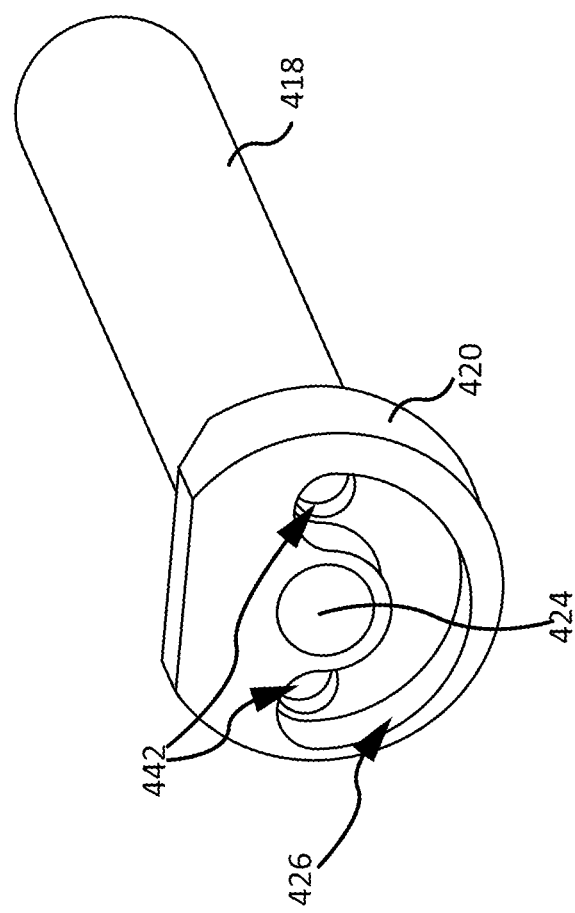
FIG. 5A illustrates a detailed perspective view of a spacer of a spacer assembly, in accordance with various embodiments.
Figure 5C:
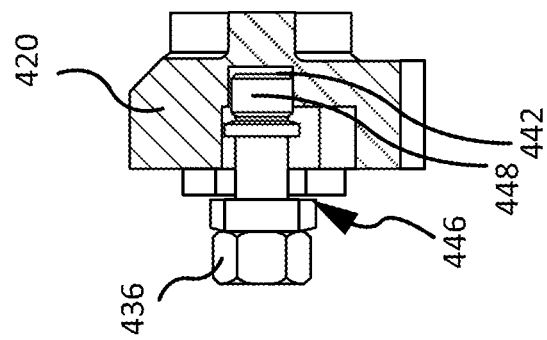
FIGS. 5C and 5D illustrates a cross-sectional view of a spacer assembly, in accordance with various embodiments.
Figure 5D:
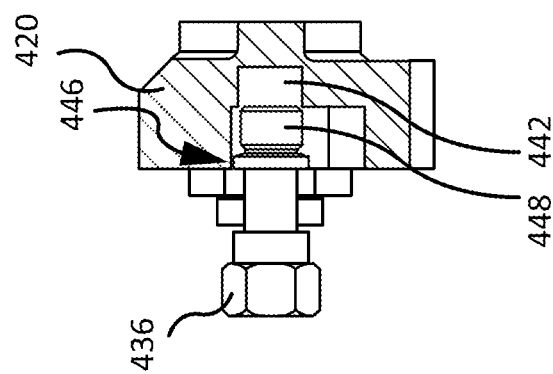

Referring now to FIGS. 5A-5D, details of the spacer assembly 400 are illustrated. The spacer head 420 may include threaded holes 442 positioned at either end of the guide groove 426. The threaded holes 442 are configured to receive the screw 436 to facilitate a locking and unlocking of the spacer assembly 400 as will be further described herein. The guide groove 426 may be a semi-circular slot extending along the circumference of the spacer head 420. The guide groove 426 may be positioned around the eccentric hole 424. The screw 436 may include a step cut 444 configured to ensure the screw 436 is not released (e.g., become free, loose, etc.) when unscrewed and while it is guided along the guide groove 426. The screw 436 may include at least one projection 446 configured to facilitate a smooth movement along the guide groove 426. The screw 436 may further include a thread 448 configured to thread with the threaded holes 442 of the spacer head 420. As shown in FIGS. 5C, when in an unfastened position, the thread 448 is not entirely received by the threaded hole 442, whereas, as shown in FIG. 5D, the threaded hole 442 is mated with the thread 448 when in a fastened position. Further, the at least one projection 446 prevents excessive unscrewing and screwing, respectively.

Referring now to FIGS. 6A-6C, a first end view, a side view, and a second end view of the spacer assembly 400 is shown, respectively, in an unlocked position. In conjunction, referring to FIGS. 7A-7C, a first end view, a side view, and a second end view of the spacer assembly 400 is shown, respectively, in a locked position. In the unlocked position, the screw 436 is positioned through the slot 440 of the lever 432 and into the threaded hole 442 on the left. In an unlocked positioned, the eccentric leg 430 aligns with the circumference of the spacer 418. Thus, the spacer assembly 400 could be removed from the tray 404. To lock the spacer assembly, the screw 436 is loosened from the left side threaded hole 442 and rotated by 180 degrees (e.g., rotated counterclockwise along the guide groove 426). The eccentric leg 430 of the shaft 428 gradually comes out of a spacer shell envelope (e.g., travels axially away from the second end 412) to act as a stopper. The screw 326 is tightened over the right side threaded hole 442 to remain in locked condition. The eccentric leg 430 acts as a stopper in that the eccentric leg 430 extends beyond the circumference of the spacer 418. As such, the eccentric leg 430, disposed on an outer surface of the second sidewall 404c prevents the spacer assembly 400 from being removed from the tray 404. In other words, the eccentric leg 430 is larger than the aperture 414. Due to the offset positioning (e.g., eccentricity) of the eccentric hole 424 that houses the shaft 428, the rotation of the eccentric leg 430 is not symmetrical. To again unlock the spacer assembly 400, the screw 436 is loosened from the right side threaded hole 442 and rotated by 180 degree reverse (e.g., clockwise along the guide groove 426) and the eccentric leg 430 gradually comes within the spacer shell envelope (e.g., travels axially toward the second end 412). The screw 436 is tightened over the left side threaded hole 442 to remain in unlocked condition. The left and right threaded holes 442 may be located horizontally from each other, on opposite sides of the eccentric hole 424 in order to indicate if the screw 436 is not fastened. For instance, if the screw 436 is not properly threaded, the lever 432 will fall (e.g., rotate 90 degrees) and the screw 436 and/or slot 440 will be position in the center of the guide groove 426 such that a person conducting an inspection can see the spacer assembly 400 is not locked correctly. In various embodiments, the surface 422 may include indicators (e.g., colored dots, lock symbols, etc.) indicating which position (e.g., the screw 436 on the left or right side) is the locked or unlocked position.

A spacer assembly, as described herein, advantageously reduces the difficulty of an installation for an operator. The spacer assembly is an easy and quick solution to install roller or any other line replaceable unit that uses such spacers. The spacer assembly eliminates unauthorized removal of roller or other line replaceable unit. Further, the spacer assembly can also be used in blind locations where the accessibility is limited to one side, and eliminates loose parts during inflight installation or removal.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A spacer assembly, comprising:
   a shaft having an eccentric leg;
   a spacer having a first end and a second end, the spacer configured to receive the shaft such that the eccentric leg is positioned adjacent to the second end of the spacer;
   a lever configured to couple with the shaft at the first end of the spacer, the lever configured to rotate the shaft relative to the spacer; and
   a screw configured to fasten the lever to the spacer, wherein the eccentric leg extends radially from the shaft and beyond a circumference of the spacer in response to the shaft being rotated by the lever into a locked position.

2. The spacer assembly of claim 1, further comprising a collar configured to couple with the shaft at the first end to secure the shaft in the spacer in response to the shaft being received by the spacer.

3. The spacer assembly of claim 1, wherein the spacer comprises an eccentric hole extending between the first end and the second end, the eccentric hole configured to receive the shaft.

4. The spacer assembly of claim 3, further comprising a spacer head coupled to the spacer at the first end, the spacer head having a surface, wherein the spacer head comprises the eccentric hole and a guide groove disposed on the surface, wherein the guide grove extends along a circumference of the spacer head, the guide groove surrounding at least a portion of the eccentric hole.

5. The spacer assembly of claim 4, wherein the spacer head further comprises at least one threaded hole disposed along the guide groove, the at least one threaded hole configured to couple with the screw such that the screw fastens the lever in a locked or unlocked position.

6. A cargo handling system, comprising:
an aircraft structure frame;
a tray coupled to the frame;
a roller assembly configured to be disposed within the tray; and
a spacer assembly further comprising:
   a shaft having an eccentric projection configured to interact with the roller assembly and the tray;
   a spacer having a first end and a second end, the spacer configured to receive the shaft;
   a collar configured to couple with the shaft at the first end to secure the shaft in the spacer in response to the shaft being received by the spacer;
   a lever configured to couple with the shaft at the first end, the lever configured to rotate the shaft relative to the spacer; and
   a screw configured to fasten the lever to the spacer.

7. The cargo handling system of claim 6, wherein the tray comprises:
a base;
a first sidewall extending from the base, the first sidewall having a first aperture; and
a second sidewall extending from the base, the second sidewall having a second aperture, the second sidewall opposite the first sidewall;
wherein the first aperture and the second aperture are configured to receive the spacer assembly.

8. The cargo handling system of claim 7, wherein the eccentric projection extends radially from the shaft and is configured to be in confronting relation with an outside surface of the second sidewall in a locked position.

9. The cargo handling system of claim 6, wherein the spacer comprises an eccentric hole extending between the first end and the second end, the eccentric hole configured to receive the shaft.

10. The cargo handling system of claim 9, further comprising a spacer head coupled to the spacer at the first end, the spacer head comprising the eccentric hole and a guide groove disposed on a surface of the spacer head, wherein the guide grove extends along a circumference of the spacer head, the guide groove surrounding the eccentric hole.

11. The cargo handling system of claim 10, wherein the spacer head further comprises at least one threaded hole disposed along the guide groove, the at least one threaded hole configured to couple with the screw such that the screw fastens the lever in a locked or unlocked position.

12. The cargo handling system of claim 10, wherein the spacer head includes a flat side configured to interface with the tray to prevent rotation of the spacer.

13. The cargo handling system of claim 10, wherein the spacer head has a diameter greater than a diameter of the spacer such that the spacer head is configured to be in confronting relation with and outside surface of the first sidewall.

14. The cargo handling system of claim 7, wherein the roller assembly comprises a roller and at least one bearing configured to be positioned between the first and second sidewalls and aligned with the first and second apertures such that the spacer assembly is configured to be received by the first and second apertures and the roller assembly to secure the roller assembly in position within the tray.

15. A method of operating a cargo handling system, the method comprising:
positioning a roller assembly within a tray, the tray coupled to an aircraft structure frame;
inserting a spacer assembly through the tray and the roller assembly, the spacer assembly comprising a shaft having an eccentric projection configured to interact with the roller assembly and the tray;
loosening a screw of the spacer assembly, wherein the screw is coupled to a lever and the lever is coupled to the shaft;
rotating the screw and the lever 180 degrees; and
tightening the screw.

16. The method of claim 15, wherein rotation of the lever rotates the shaft such that the eccentric projection rotates and becomes positioned in confronting relation with an outside surface of a sidewall of the tray to lock the spacer assembly in place within the tray.

17. The method of claim 15, wherein the spacer assembly comprises at least one threaded hole configured to couple with the screw such that the screw fastens the lever in a locked or unlocked position.

* * * * *